United States Patent Office 3,233,103
Patented Feb. 1, 1966

3,233,103
NEUTRON ENERGY SPECTROMETERS
Ryozo Aoki, Tokyo, Japan, assignor to Hitachi Ltd., Tokyo, Japan, a corporation of Japan
Filed Dec. 31, 1962, Ser. No. 248,707
6 Claims. (Cl. 250—71.5)

The present invention relates to improvements in the structure of neutron energy spectrometers and has for its object to provide a neutron energy spectrometer having an improved detecting efficiency and an improved energy spectrum resolution. Another object of the present invention is to provide a neutron energy spectrometer of the character described which is relatively simple in construction and is capable of undisturbed and accurate measurement involving ideally no measuring errors as caused by the neutron scattering and the local thermal neutron background.

According to the present invention, a neutron energy spectrometer comprises a detector section including a main scintillator formed of liquid helium, $He^3$, and a photoelectric transducer element connected with said main scintillator by way of a light-transmitting pipe and a spectrum counter section including an anti-coincidence gate circuit.

Figure 1:
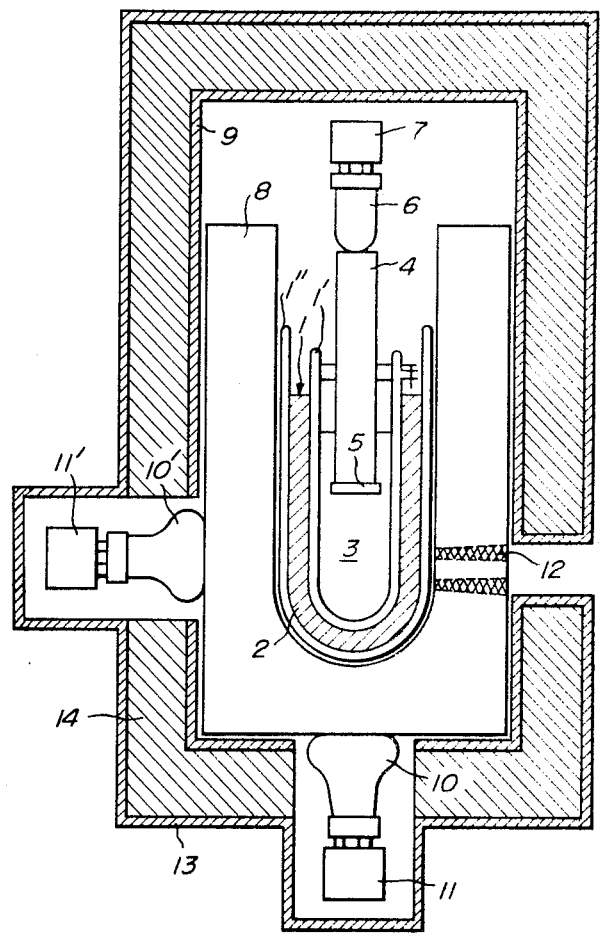
Figure 2:
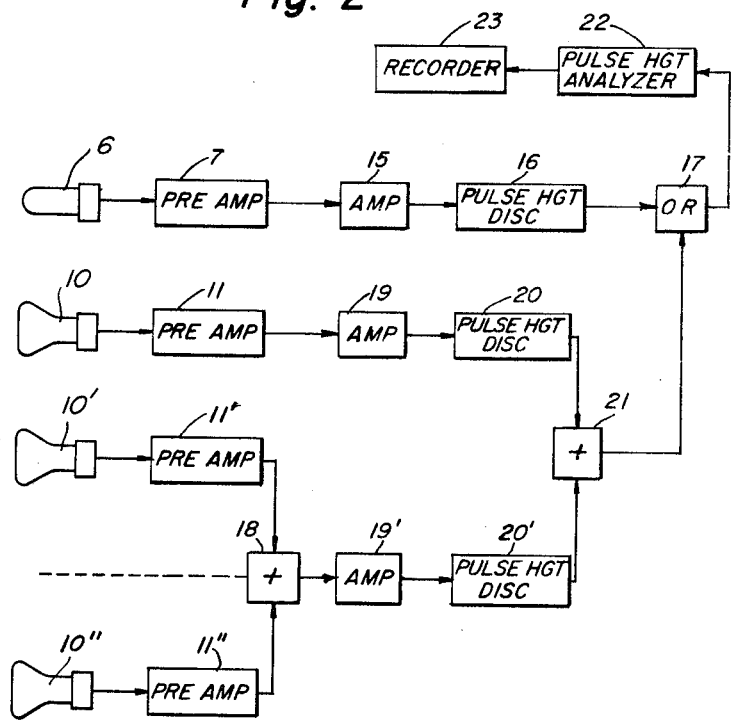

These and other objects, features and advantages will become apparent from the following detailed description when taken with reference to the accompanying drawings, which illustrate one embodiment of the invention and in which:

FIG. 1 is a schematic cross section showing the detector section of a preferred embodiment of the invention; and FIG. 2 is a schematic diagram showing one form of the entire output circuit of the detector section shown in FIG. 1.

Referring first to FIG. 1, the detector section includes a double type Dewar vessel generally indicated at 1 which is comprised of an inner Dewar vessel 1' and an outer Dewar vessel 1" with a cooling medium in the form of a mass of liquid nitrogen 2 filled therebetween. Sealed in the inner Dewar vessel 1' is a main scintillator 3, which takes the form of a mass of liquid helium-3 ($He^3$) according to the invention. A light-transmitting pipe 4 of suitable axial length carries at its one end a transparent disc 5 upon the outer surface of which a wavelength shifter has been vapor-deposited and is arranged with the disc 5 immersed in the scintillator 3. A photomultipler 6 and a preamplifier 7 are mounted on the other end of the light-transmitting pipe 4.

An outer scintillator 8 is provided for the detection of neutrons escaping out by elastic scattering from the main scintillator and is conventionally formed of an organic scintillating material containing boron-10 ($B^{10}$) or cadmium (Cd). The outer scintillator 8 is contained in a casing 9 formed of boron steel. Photomultipliers 10, 10' and preamplifiers 11, 11' are arranged in sets about the periphery of the casing 9. Though two sets of these units are shown in the drawing, any number of them may be employed as required. A collimator for the neutron beam to be measured is provided as indicated at 12. The collimator 12 forms a substantially cylindrical neutron beam passage which penetrates the scintillator 8 providing direct access for the neutron beam to the main scintillator 3 while preventing direct access for the beam to the scintillator 8. A shield case 13 formed of boron steel surrounds the scintillator-containing casing 9 with a shield 14 interposed between the opposing walls of the shield case 13 and the casing 9 and is effective to substantially completely shield neutrons scattering-in from the surrounding atmosphere as background.

In FIG. 2, which illustrates one form of the output circuit of the detector shown in FIG. 1, reference numeral 15 denotes a linear pulse amplifier; 16 a pulse-height discriminator circuit; 17 a pulse anti-coincidence gate circuit; 18 a pulse-signal summing circuit; 19, 19' linear pulse amplifiers; 20, 20' pulse-height discriminator circuits; 21 a pulse coincidence or summing circuit; 22 a multichannel pulse-height analyser; and 23 a data recorder.

In operation, when a neutron beam to be measured is introduced through the collimator 12 (FIG. 1) into the liquid helium-3 scintillator 3 in the Dewar vessel 1, the light produced correspondingly to the neutron energy is introduced through the wavelength-shifter-evaporated disc 5 and light-transmitting pipe 4 into the photomultipler 6 to be transformed into electric energy. The electric energy is directed through the preamplifier 7, linear pulse amplifier 15 (FIG. 2), pulse-height discriminator circuit 16 and pulse anti-coincidence gate circuit 17 to the multichannel pulse-height analyser 22 and further to the data recorder 23, and thus the neutron energy spectrum is analysed and recorded.

The spectrometer according to the present invention, employs liquid helium-3 ($He^3$) as a main scintillator 3 as described hereinbefore. Such scintillator is high in atomic density and thus presents a large collision cross section to neutrons, providing for a high detection efficiency, as compared with conventional scintillators employing gaseous helium. The use of a liquid helium-3 scintillator is also advantageous in that in the process of preparing liquid helium-3 any impurity atoms which tend to quench the scintillation can be solidified and effectively removed by virtue of the extreme low temperatures involved. In addition, the thermal oscillation-quenching effect is substantially negligible because of the extreme low temperature of the liquid helium. This allows the scintillation output produced by the passage of neutrons to be measured through the scintillator without being quenched to any substantial extent, thus making it possible to analyse the neutron energy spectrum with a highly improved resolution. The mounting of the photomultiplier 6 on the light-transmitting pipe 4, but not directly on the scintillator 3, is effective to keep the photosensitive surface and other parts of the photomultiplier at a suitably low temperature thereby to reduce the thermal noise of the multiplier improving the signal-to-noise ratio of the detector output. In the event that the neutrons being measured are scattered out within the scintillator 3 in the Dewar vessel 1, the detector output does not form a monoenergetic spectrum but forms a continuous spectrum, which spreads over so that the pulse height does not correspond to the neutron energy level. Under these circumstances, scintillation is affected within the main scintillator 3 corresponding to the portion of the neutron energy being measured, but at the same time the scattered neutron gives rise to scintillation in the outer scintillator 8. Accordingly, not only a detector output from the photomultiplier 6 is directed to the pulse anti-coincidence gate circuit 17 but at the same time either of the photomultipliers 10, 10' or 10" associated with the outer scintillator 8 produces a detector output, which passes through the associated preamplifier 11, 11' or 11", pulse-signal summing circuit 18, pulse amplifier 19 or 19', pulse-height discriminating circuit 20 or 20' and further through pulse coincidence or summing circuit 21 to the pulse anti-coincidence gate circuit 17. Consequently, the gate 17 is closed to cut off the input to the multichannel pulse-height analyser 22 thereby to render the latter inoperative, eliminating the danger of the scattering causing a spectrum error.

The arrangement of the shield case 13 and the shield 14 around the periphery of the detector section is effective to shield substantially all the local thermal neutron background. Even if a background of such an intensity as to penetrate the shielding structure exists, the reduction in the detection efficiency due to the chance anti-coincidence at the gate 17 may be minimized by the selection of only the coincidence signal from the detection output of each of the photomultipliers 10, 10' and 10'' by the pulse coincidence or summing circuit 21 since the scintillation of the outer scintillator 8, which is associated with said photomultipliers 10, 10', and 10'', is more frequent than when he scattering takes place as described above.

It will be appreciated from the foregoing that the neutron energy spectrometer of the invention is highly valuable in practical applications in that it has an improved detecting efficiency and energy spectrum resolution and is capable of undisturbed accurate measurement involving little measuring errors as caused by the neutron scattering and the local thermal neutron background in spite of its simple construction.

The invention is not restricted to the details set forth but may be varied in many ways within the scope of the appendant claim.

What is claimed is:

1. A neutron energy spectrometer comprising:
    a first scintillator containing liquid helium 3,
    a photoelectric transducer element adapted to translate light rays into electrical pulses,
    a light-transmitting pipe connecting said first scintillator to said photoelectric transducer element,
    a second scintillator surrounding said first scintillator,
    a plurality of photomultiplier devices in communication with said second scintillator,
    means for introducing neutrons directly to said first scintillator while preventing direct application of neutrons from outside said spectrometer to said second scintillator, said first and second scintillators being arranged and constructed such that neutrons within said first scintillator may pass into said second scintillator,
    and an anti-coincidence gate circuit connected on the one hand to the output of said photoelectric transducer and on the other hand to the combined outputs of said photomultiplier devices.

2. A neutron energy spectrometer comprising:
    a first scintillator containing liquid helium 3 and a second scintillator surrounding said first scintillator,
    spectrum analyzer means for determining the energy spectrum of neutrons directly incident upon said first scintillator, and
    means responsive to passage of neutrons from said first scintillator to said second scintillator for rendering said spectrum analyzer means ineffective.

3. A neutron energy spectrometer comprising:
    a first scintillator containing liquid helium 3,
    a second scintillator substantially completely surrounding said first scintillator,
    shield means completely surounding said second scintillator including means for permitting direct access by neutrons outside said spectrometer to said first scintillator while preventing such direct access to said second scintillator,
    spectrum analyzer means for determining the energy spectrum of said neutrons directly incident upon said first scintillator, and
    means responsive to passage of neutrons from said first scintillator to said second scintillator for rendering said spectrum analyzer means ineffective.

4. A neutron energy spectrometer comprising:
    a first scintillator containing liquid helium 3,
    a second scintillator substantially completely surrounding said first scintillator,
    shield means completely surrounding said second scintillator including means for permitting direct access by neutrons outside said spectrometer to said first scintillator while preventing such direct access to said second scintillator,
    spectrum analyzer means for determining the energy spectrum of said neutrons directly incident upon said first scintillator, and
    means responsive to passage of neutrons from said first scintillator to said second scintillator for rendering said spectrum analyzer means ineffective,
    said spectrum analyzer means including photoelectric transducer means in communication with said first scintillator for translating light rays into electrical pulses, pulse analyzer means and recorder means.

5. A neutron energy spectrometer comprising:
    a first scintillator containing liquid helium 3,
    a second scintillator substantially completely surrounding said first scintillator,
    shield means completely surrounding said second scintillator including means for permitting direct access by neutrons outside said spectrometer to said first scintillator while preventing such direct access to said second scintillator,
    spectrum analyzer means for determining the energy spectrum of said neutrons directly incident upon said first scintillator, and
    means responsive to passage of neutrons from said first scintillator to said second scintillator for rendering said spectrum analyzer means ineffective,
    said means responsive to passage of neutrons into said second scintillator means including a plurality of photomultiplier means in communication with said second scintillator for translating light rays into electrical pulses, means for combining the electrical pulses from said photomultiplier means, and anti-coincidence circuit means connected to said spectrum analyzer means and said pulse-combining means for interrupting said analyzer means upon detection of coincident signals in said analyzer means and said pulse-combining means.

6. A neutron energy spectrometer comprising:
    a first scintillator containing liquid helium 3,
    a second scintillator substantially completely surrounding said first scintillator,
    shield means completely surrounding said second scintillator including means for permitting direct access by neutrons outside said spectrometer to said first scintillator while preventing such direct access to said second scintillator,
    spectrum analyzer means for determining the energy spectrum of said neutrons directly incident upon said first scintillator, and
    means responsive to passage of neutrons from said first scintillator to said second scintillator for rendering said spectrum analyzer means ineffective,
    said spectrum analyzer means including photoelectric transducer means in communication with said first scintillator for translating light rays into electrical pulses, pulse analyzer means and recorder means,
    said means responsive to passage of neutrons into said second scintillator means including a plurality of photomultiplier means in communication with said second scintillator for translating light rays into electrical pulses, means for combining the electrical pulses from said photomultiplier means, and anti-coincidence circuit means connected to said spectrum analyzer means and said pulse-combining means for interrupting said analyzer means upon detection of coincident signals in said analyzer means and said pulse-combining means.

References Cited by the Examiner

UNITED STATES PATENTS 2,830,184  4/1958  Scherbatskoy _____ 250—71.5
3,047,720  7/1962  Rickard _____ 250—71.5

OTHER REFERENCES

Liquid Helium Scintillation Counter as a Neutron Polarimeter by Simmons et al., Review of Scientific Instruments, vol. 32, No. 11, Nov. 1961, pp. 1173 to 1178.

RALPH G. NILSON, *Primary Examiner.*

JAMES W. LAWRENCE, *Examiner.*